United States Patent
Healis

[15] 3,662,797
[45] May 16, 1972

[54] SCREWDRIVING APPARATUS

[72] Inventor: George A. Healis, Fort Lauderdale, Fla.

[73] Assignee: Behring Corporation, Fort Lauderdale, Fla.

[22] Filed: June 18, 1970

[21] Appl. No.: 47,412

[52] U.S. Cl. .............................................................. 144/32
[51] Int. Cl. .................................... B23p 19/06, B25b 21/00
[58] Field of Search .................. 144/32; 408/13; 81/52.4; 29/208 C; 145/52

[56] References Cited

UNITED STATES PATENTS

| | | | |
|---|---|---|---|
| 2,314,760 | 3/1943 | Blair | 144/32 |
| 3,011,534 | 12/1961 | Vilmerding | 144/32 |
| 3,583,451 | 6/1971 | Dixon | 144/32 |

*Primary Examiner*—Donald R. Schran
*Attorney*—Settle and Oltman

[57] ABSTRACT

A rotary screwdriver tool is movable reciprocatively along a linear path to drive a screw temporarily held by screw holders fitting together to retain a screw in the path of the tool. The screw holders are separable as the tool passes between them. Screws are fed successively to the holders by feed means. A cam device further separates the holders during the return stroke of the tool to release any screw which fails to enter the work. The operation of the apparatus is controlled pneumatically.

6 Claims, 10 Drawing Figures

Patented May 16, 1972

NEUTRAL

FOREWARD

REVERSE

INVENTOR.
GEORGE A. HEALIS.
BY
SETTLE & OLTMAN.
ATT'YS.

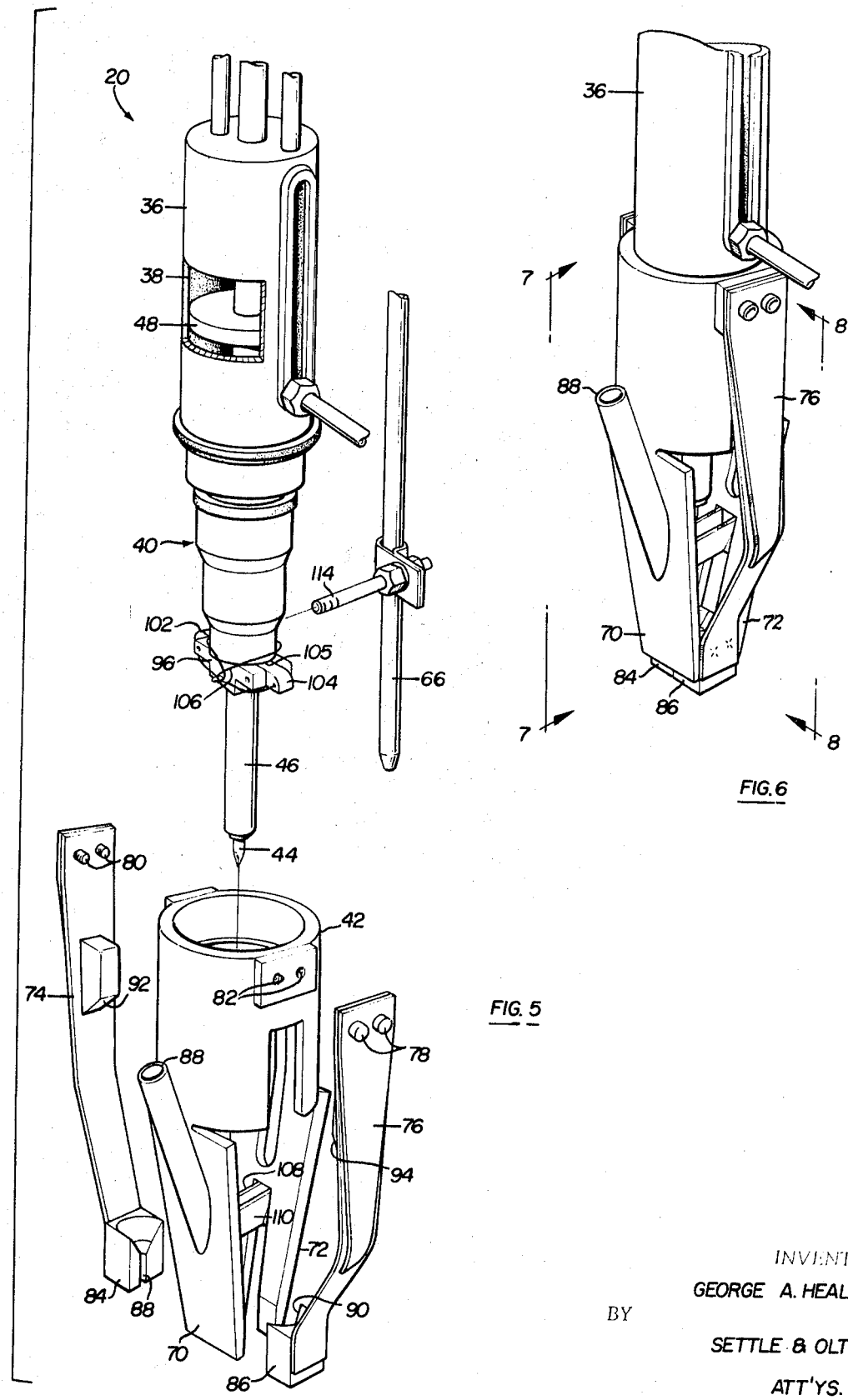

Patented May 16, 1972

INVENTOR.
GEORGE A. HEALIS.
BY
SETTLE & OLTMAN.
ATT'YS.

SCREWDRIVING APPARATUS

BACKGROUND OF THE INVENTION

Although portable power drills and screwdrivers are well known, problems have been encountered in feeding and temporarily retaining screws for a screwdriver in a manner to facilitate rapid, automatic driving of screws. Sometimes a screw has to be started manually and then driven by machine. Another problem arises from faulty screws, particularly blunt tipped screws which may not enter the work at all.

SUMMARY OF THE INVENTION

The present invention provides a power screwdriving apparatus with automatic feed of screws to the tool which drives them. The screws are fed through a conduit to screw holders which fit together to receive and retain a screw in the path of the tool. A pneumatic drive advances the tool between the holders which then separate to release the screw. In a preferred embodiment, cam means moves with the tool and engages cam follower means on the return stroke of the tool to separate the holders If a blunt screw has remained in the holders, it is released when the tool returns to prevent fouling or jamming of the apparatus and to eject the faulty screw from the apparatus.

Accordingly, it is an object of the invention to provide an improved screwdriving apparatus with automatic screw feed mechanism.

Another object of the invention is to pneumatically sense the driving of the screw into the work and thus control the reversal of the screwdriver.

Another object of the invention is to provide screwdriving apparatus with holders which retain a screw prior to the screw being driven and which separate when the tool passes between them.

A further object of the invention is to provide a mechanism for separating the screw holders on the return stroke of the tool to release a faulty screw.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 5 is an exploded perspective view of the screwdriving apparatus;

FIG. 6 is a perspective view showing the parts of the apparatus as assembled;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 1:
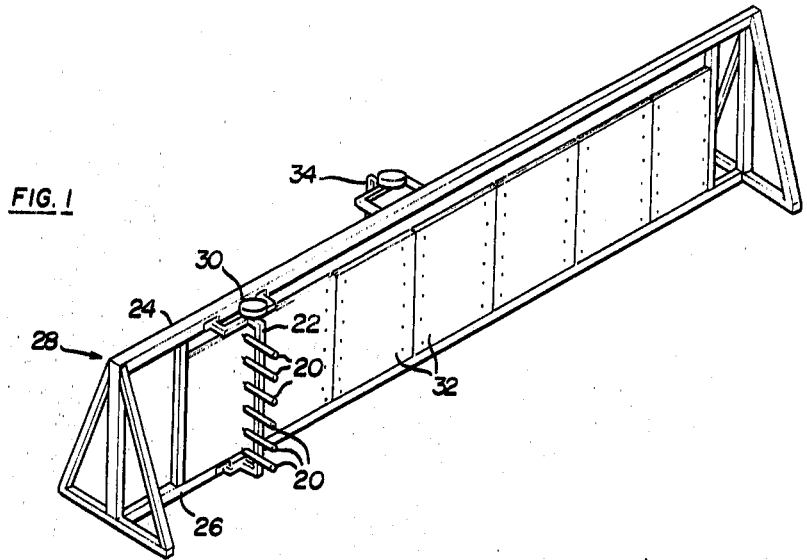
FIG. 1 is a perspective view of a number of panels being attached to a frame utilizing a plurality of screwdriving devices.

FIG. 1 is illustrative of one application for the screwdriving apparatus of the present invention. A plurality of screwdriving devices 20 are mounted in a vertical column on a support 22 which in turn is mounted for movement along the upper and lower beams 24 and 26 of a frame 28. Screws are fed to the devices 20 from a hopper 30 mounted on the top of the support 22. The frame 28 is a fixture for holding panels 32 while they are being attached to a supporting frame (not shown) in the building of a unit such as a wall unit for a building. Units of this type are sometimes manufactured in the construction of modular buildings. The screwdriving devices 20 drive screws through the panels 32 into the wall frame (not shown) to attach the panels to the frame. Another like bank of screwdriving devices may be mounted on another support 34 identical to the support 22 in a manner such that panels may also be attached to the opposite side of the wall frame (not shown) in the frame fixture 28. This merely illustrates one possible utility of the apparatus of the invention, but is not intended to limit the utility of the invention.

A screwdriving apparatus 20 is shown in more detail in the other figures of the drawings. The apparatus 20 includes an upper housing 36, a portion of which is broken away at 38 in FIG. 5 to reveal a pneumatic motor generally designated 40 partly inside the housing. Such pneumatic motors for screwdrivers and drills are well known in the art and will not be described in detail herein. Attached to the housing 36 as with screw fasteners is a cylindrical head 42 having a hollow interior in which a screwdriving tool 44 is located. The tool 44 is operatively connected to the pneumatic motor 40 so that the tool can be rotated by the motor. The tool 44 projects from a sleeve 46 which is mounted on the motor unit 40. The motor unit 40 includes a piston 48 visible inside opening 38 in FIG. 5. The piston 48 may be actuated by air pressure to advance the motor unit 40, the sleeve 46 and the tool 44 through the interior of the head 42 to drive a screw. The reciprocation of the tool 44 and the rotation the tool 44 occur simultaneously.

Figure 2:
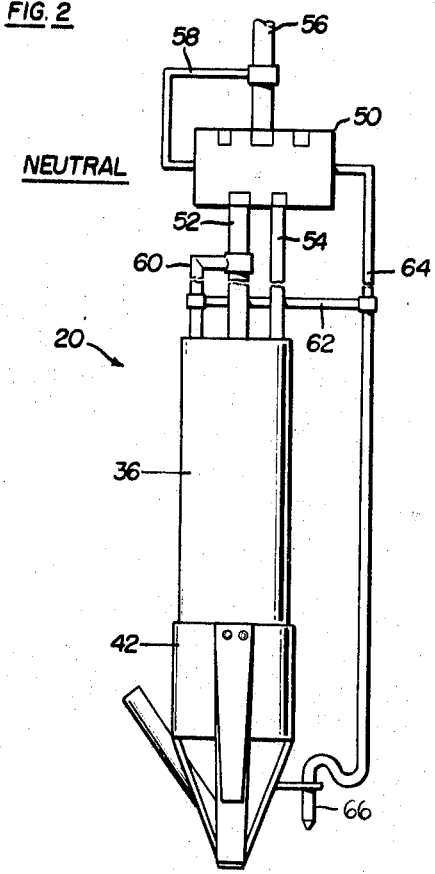
FIG. 2 is a schematic view of screwdriving apparatus in accordance with one embodiment of the invention.
Figure 3:
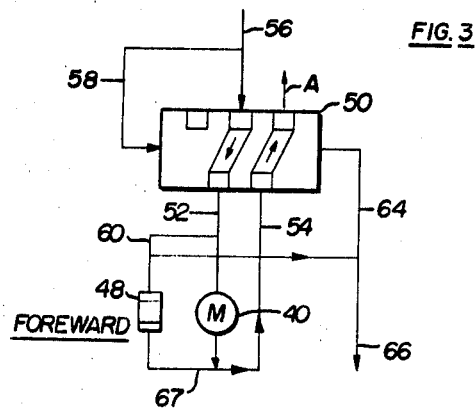
FIG. 3 is a schematic view illustrating the operation of a pneumatic system associated with the screwdriving apparatus.
Figure 4:
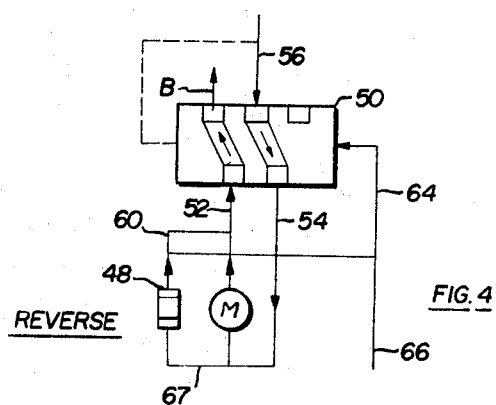
FIG. 4 is another schematic view illustrating reverse operation of the pneumatic system of the apparatus.

FIGS. 2, 3 and 4 schematically illustrate a pneumatic system for operating the screwdriving apparatus. A spool valve 50 of conventional construction is connected to the motor inside the housing 36 by conduits 52 and 54. Air enters the spool valve from an air supply through a conduit 56. A branch conduit 58 leads from conduit 56 to one end of the spool valve 50. Another branch conduit 60 leads from conduit 52 into the motor inside housing 36. A cross conduit 62 leads from conduit 60 to a vertical conduit 64, the upper branch of which connects to the right end of spool valve 50, and the lower branch of which extends through a flexible tip 66 which is connected to the reciprocating portion of the apparatus.

The spool valve 50 and the various conduits just referred to are shown schematically in FIGS. 3 and 4, the conduits being designated by the same reference numerals but represented by arrow tipped lines. As shown in FIG. 3, air entering spool valve 50 through conduit 56 passes through the spool valve to conduit 52 and flows to the motor 40 for rotating the tool 44. Part of this air branches off from conduit 52 and flows through conduit 60 to the piston 48 for advancing the tool 44. Return air flows through conduit 54 and the spool valve 50 and exhausts at "A". Part of the incoming air flowing through conduit 56 branches off and flows through conduit 58 to actuate the spool valve 50 to the condition shown in FIG. 3.

The sensing function is performed by the conduit branches 64 and 66. The tip of conduit portion 66 is approximately positioned even with the tool 44 so that when the tool 44 drives a a screw fully home into the work, the end of conduit portion 66 closes on the work surface. This blocks off air flow through conduit portion 66, and increases air pressure in the upper portion of conduit 64 which leads to the right end of the spool valve 50. This increased pressure in conduit 64 actuates the spool valve 50 to the condition shown in FIG. 4. In this condition, air flowing in conduit 56 flows through the spool valve 50 and conduit 54 to the motor 40 to drive the motor in the reverse direction. Some of the air flowing in through conduit 54 branches off at 67 which represents an internal conduit. Air flows through conduit 67 to drive the piston 48 in the reverse direction. Return air flows through conduit 52 and the spool valve to exist at arrow "B".

Referring now to FIGS. 5 through 10, it may be seen that the head 42 has depending legs 70 and 72 which are spaced apart at the lower tip of the head to allow the tool 44 to pass between them. Two spring arms 74 and 76 are attached to the head 42 as with screws which go through eyelets 78 and 80 into openings 82 in the head. At the lower ends of spring arms 74 and 76 are respectively mounted screw holders 84 and 86. The screw holders 84 and 86 are respectively recessed at 88 and 90 so that the screw holders fit together to define an aperture for receiving and retaining a screw in the manner shown particularly in FIG. 7 and 8. The holders 84 and 86 may be shaped metal blocks fastened to the spring arms 74 and 76. Other springs may be used.

Leading through leg 70 of head 42 is a feed conduit 88 through which screws are fed successively from an automatic feed hopper such as the hopper 30 shown in FIG. 1. The conduit 88 angles downwardly toward the opening or aperture defined by screw holders 84 and 86, and it may be seen that the upper ends of the recesses 88 and 90 are flared to form a tapered pocket for directing the screw into the aperture between the screw holders. The screws may be fed with compressed air through the tube 88. A screw 90 is shown retained in the screw holders 84 and 86 in FIG. 7 and 8.

Two cam follower members 92 and 94 are attached to the inner sides of the spring arms 74 and 76 respectively. A support 96 is attached to the upper end of sleeve 46. The support 96 has laterally projecting bifurcated arms 98 and 100 between which are respectively pivotally pinned two cams 102 and 104. The cams 102 and 104 are normally urged to a horizontal position as shown in full lines in FIG. 8. The cams 102 and 104 are biased to this position by a wire spring 106, and cannot turn further because surface 105 acts as a stop.

Figure 8:
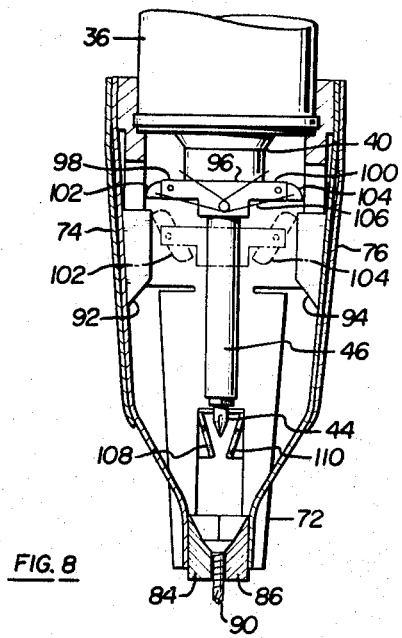
FIG. 8 is a sectional view taken along line 8—8 of FIG. 6.

In operation, when the tool 44 begins to advance downward toward the screw 90, the cams 102 and 104 ride over the cam followers 92 and 94, and in doing so, the cams 102 and 104 rotate to the position shown in dashed lines in FIG. 8. Thus, the spring arms 74 and 76 are not spread as the cams 102 and 104 pass over the cam followers 92 and 94.

Figure 9:
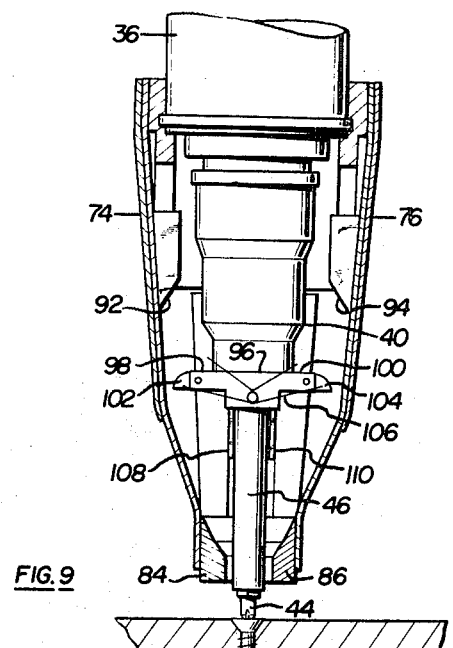
FIG. 9 is a sectional view similar to FIG. 8, but showing the tool of the apparatus in an advanced position as it drives a screw into work pieces.

FIG. 9 shows the condition of the apparatus when the tool 44 has completed driving a screw 90 into work pieces. It may be seen that the cams 102 and 104 have passed the cam followers 92 and 94 and have returned to their horizontal positions under the bias of the spring 106. Then when the tool 44 is retracted in accordance with the previous description, the cams 102 and 104 engage the cam followers 92 and 94, and because the cams 102 and 104 cannot rotate in the opposite direction, they force the spring arms 74 and 76 apart in the manner shown in FIG. 10. The purpose of this spreading of the spring arms 74 and 76 becomes apparent when it is considered that sometimes a screw is fed to the apparatus which is faulty such that it will not enter the work pieces. For example, the screw may have a blunt tip. If this happens, the screw will remain in the screw holders 84 and 86 when the tool 44 is advanced. If the screw were to remain in the screw holders too long, another screw could be fed into the apparatus with resulting possibilities of jamming. The cams 102 and 104 obviate this possibility by separating the screw holders 84 and 86 to release the screw 90 so that it will eject from the apparatus.

Figure 7:
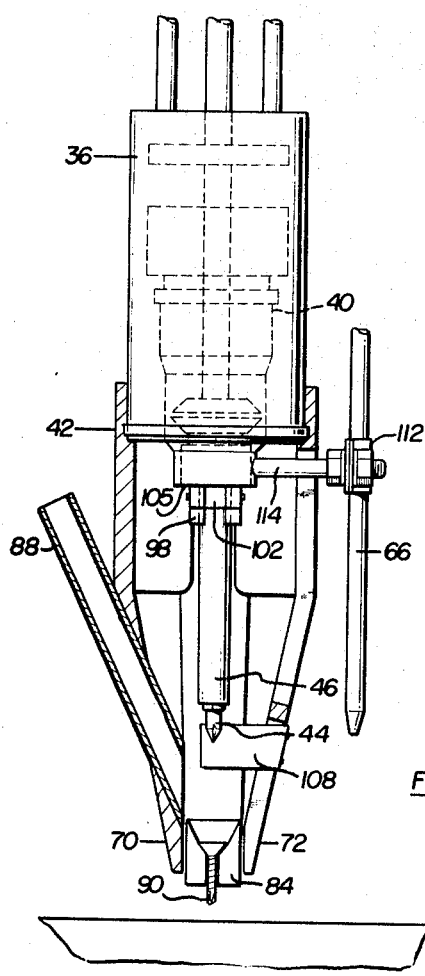
FIG. 7 is a view, partly in section, the section being taken along line 7—7 of FIG. 6.
Figure 10:
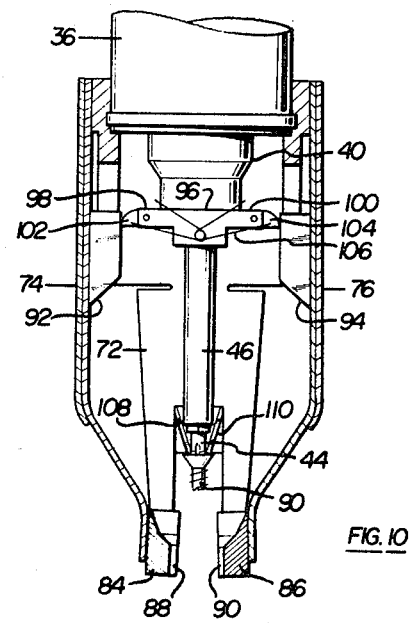
FIG. 10 is another view smaller to FIG. 8, but showing the operation of the apparatus when a faulty screw fails to enter the work.

FIG. 10 shows that it may be possible for the screw 90 to be released from the screw holders 84 and 86 by remaining fixed to the tool 44 as a result of wedging action of the tool against the screw head. For this reason, wipers 108 and 110 are mounted on the legs 70 and 72 directly adjacent the path of the tool 44 to engage the screw 90 and remove it from the tool 44 so that the screw will fall out of the apparatus. One of the wipers 108 is shown in the form of a blade in FIG. 7, the blade being attached to leg 72 as with a clip. FIG. 7 also shows that the conduit portion 66 may be held in a clamp which is connected by a rod 114 to the lower end of the motor unit 40.

It is apparent from the foregoing description that the invention provides screwdriving apparatus capable of automatically driving screws in rapid succession, the apparatus having structure for automatic feeding and retention of screws so that they can be driven one after the other in rapid succession. The apparatus also includes a camming device for ejecting faulty screws which do not enter the work, thus preventing fouling of the apparatus in operation. The apparatus is particularly useful in high volume production operations, an example being production of modular homes.

I claim:

1. A screwdriving apparatus including in combination, a rotary and reciprocative screwdriver tool, a head having an open interior through which said tool is advanced to drive a screw, a pair of spring means carried by said head, a pair of recessed screw holders biased by said spring means and fitting together to define an aperture in the path of said tool for receiving and retaining a screw, cam follower means connected to said screw holders respectively, cam means movable reciprocatively with said tool and engageable with said cam follower means, and means for advancing said tool between said holders to drive a screw, with said cam means riding over said cam follower means without spreading said holders, said cam means engaging said cam follower means upon the return stroke of said tool to spread said holders and thereby release any screw which fails to enter the work.

2. A screwdriving apparatus including in combination, a rotary screwdriver tool movable reciprocatively along a linear path, means to retain a screw in the path of said tool, means for advancing said tool to drive a screw from said retainer means into a workpiece, said drive means including a pneumatically controlled reversible motor, an air conduit exhausting approximately even with said tool and movable therewith, means to supply air to said air conduit, control means to control the direction of operation of said motor, and means responsive to substantial blocking of said air conduit at a work surface to deliver air to said control means and thereby reverse said motor to withdraw said tool from the workpiece.

3. A screwdriving apparatus including in combination, a rotary screwdriver tool, means to drive said tool reciprocatively along a linear path, said drive means including a pneumatically controlled reversible motor, an air conduit exhausting approximately even with said tool and movable reciprocatively therewith, means to supply air to said air conduit, means to control the direction of operation of said motor, and means responsive to substantial blocking of said air conduit at a work surface as said tool and conduit advance to deliver air to said control means and thereby reverse said motor to withdraw said tool from the workpiece.

4. A screwdriving apparatus including in combination, a rotary and reciprocative screwdriver tool, a head having an open interior through which said tool is advanced to drive a screw, a pair of spring means carried by said head, a pair of recessed screw holders biased by said spring means and fitting together to define an aperture in the path of said tool for receiving and retaining a screw, cam follower means operatively connected to said screw holders respectively, cam means movable reciprocatively with said tool and engageable with said cam follower means, said cam means engaging said cam follower means upon the return stroke of said tool to spread said holders, an air conduit exhausting approximately even with said tool and movable with said tool, a pneumatically controlled reversible motor to drive said tool, means to supply air to said air conduit, control means to control the direction of operation of said motor, and means responsive to substantial blocking of said air conduit at a work surface to deliver air to said valve means and thereby reverse said motor to withdraw said tool from the workpiece.

5. A screwdriving apparatus including in combustion, a rotary screwdriver tool movable reciprocatively along a linear path, screw holders fitting together to receive and retain a screw, means supporting said screw holders in the path of said tool, said screw holders being separable upon advance of said tool, and said screw holders further being separable during the return stroke of said tool by cam means movable with said tool to engage cam follower means operatively connected to said holders, said cam means being connnected to said tool and including a pair of rotary cams riding over said cam follower means without separating said holders upon advance of said tool and engaging said cam follower means to separate said holders upon return of said tool, means for feeding screws successively to said screw holders, and means for advancing said tool between said holders to drive a screw held thereby and for returning said tool.

6. The screwdriving apparatus as claimed in claim 5 in which said screw holders are mounted respectively on spring arms, and said cam follower means includes a cam follower mounted on each of said spring arms.

* * * * *